(12) United States Patent
Duquette et al.

(10) Patent No.: US 8,308,201 B2
(45) Date of Patent: Nov. 13, 2012

(54) CRIMP FITTING FOR CORRUGATED STAINLESS STEEL TUBING

(75) Inventors: Scott Duquette, Enfield, CT (US);
Franz Kellar, Gastonia, NC (US);
Harold Crowder, Concord, NC (US);
Vanwijak Eowsakul, Holyoke, MA (US); Brian Coppola, Amherst, MA (US)

(73) Assignee: Titeflex Corporation, Springfield, MA (US)

( * ) Notice: Subject to any disclaimer, the term of this patent is extended or adjusted under 35 U.S.C. 154(b) by 616 days.

(21) Appl. No.: 12/439,527

(22) PCT Filed: Aug. 31, 2007

(86) PCT No.: PCT/US2007/077342
§ 371 (c)(1),
(2), (4) Date: Jun. 9, 2009

(87) PCT Pub. No.: WO2008/028104
PCT Pub. Date: Mar. 6, 2008

(65) Prior Publication Data
US 2010/0007140 A1   Jan. 14, 2010

Related U.S. Application Data

(60) Provisional application No. 60/841,877, filed on Aug. 31, 2006.

(51) Int. Cl.
*F16L 33/00* (2006.01)
(52) U.S. Cl. .................... 285/256; 285/903; 29/516
(58) Field of Classification Search .............. 285/256, 285/903; 29/515, 516
See application file for complete search history.

(56) References Cited

U.S. PATENT DOCUMENTS

| | | | | |
|---|---|---|---|---|
| 2,216,468 A | * | 10/1940 | Farrar | 285/256 |
| 2,309,719 A | * | 1/1943 | Vaill | 285/256 |
| 2,583,956 A | * | 1/1952 | Lindsay et al. | 285/256 |
| 2,679,409 A | | 5/1954 | Spender et al. | |
| 2,687,904 A | * | 8/1954 | Tornblom | 285/354 |
| 2,712,949 A | * | 7/1955 | Bauer, Jr. | 285/256 |
| 2,848,254 A | * | 8/1958 | Millar | 285/256 |
| 3,023,496 A | * | 3/1962 | Millar | 285/382 |
| 3,623,513 A | * | 11/1971 | Dinkelkamp | 285/13 |
| 4,369,992 A | * | 1/1983 | Fournier et al. | 285/903 |
| 4,400,022 A | * | 8/1983 | Wright | 285/256 |
| 4,544,187 A | * | 10/1985 | Smith | 285/256 |
| 4,729,583 A | * | 3/1988 | Lalikos et al. | 285/256 |
| 4,969,669 A | * | 11/1990 | Sauer | 285/256 |

(Continued)

*Primary Examiner* — David E Bochna
(74) *Attorney, Agent, or Firm* — Edwards Wildman Palmer LLP; Jeffrey D. Hsi; Brian R. Landry (57) ABSTRACT

A fitting incorporating a crimp sealing device and a method of forming a seal between a length of corrugated tubing and the fitting are provided. A sealing crimp is formed over at least one corrugation of the tubing, where the sealing crimp can utilize a preformed bend or bulge to form a crimp and seal. Alternatively, the sealing crimp can apply pressure radially against an outer sleeve of the fitting, such that at least one corrugation of the tubing is compressed axially or radially to form a primary seal. The outer sleeve also can include one or more gaskets arranged between the outer sleeve and the tubing for forming a secondary seal. An inner sleeve can be received radially inside the outer sleeve, and one or more gaskets can be arranged between the inner sleeve and the tubing. Further, a jacket crimp can be applied against an end of the sleeve member to contact a jacket that at least partially covers the tubing.

37 Claims, 10 Drawing Sheets

U.S. PATENT DOCUMENTS

| | | | | |
|---|---|---|---|---|
| 5,040,829 A | * | 8/1991 | Sauer | 285/256 |
| 5,080,405 A | * | 1/1992 | Sasa et al. | 285/903 |
| 5,131,696 A | * | 7/1992 | Sykes et al. | 285/903 |
| 5,209,267 A | * | 5/1993 | Morin | 285/256 |
| 5,398,977 A | * | 3/1995 | Berger et al. | 285/256 |
| 5,797,629 A | * | 8/1998 | Beagle | 285/256 |
| 5,803,511 A | * | 9/1998 | Bessette | 285/256 |
| 5,829,795 A | * | 11/1998 | Riesselmann | 285/256 |
| 5,884,945 A | * | 3/1999 | Bader et al. | 285/256 |
| 6,092,274 A | * | 7/2000 | Foti | 285/256 |
| 6,173,995 B1 | | 1/2001 | Mau | |
| 6,260,584 B1 | * | 7/2001 | Foti | 285/903 |
| 6,378,914 B1 | | 4/2002 | Quaranta | |
| 6,428,052 B1 | | 8/2002 | Albino et al. | |
| 6,877,781 B2 | | 4/2005 | Edler | |
| 6,908,114 B2 | | 6/2005 | Moner | |
| 7,004,510 B2 | * | 2/2006 | Treichel | 285/903 |
| 7,017,949 B2 | * | 3/2006 | Luft et al. | 285/256 |
| 7,055,868 B2 | * | 6/2006 | Watanabe | 285/249 |
| 7,066,497 B2 | * | 6/2006 | Fullbeck et al. | 285/256 |
| 7,237,809 B2 | * | 7/2007 | Connell | 285/256 |
| 7,293,804 B2 | * | 11/2007 | Li et al. | 285/256 |
| 7,328,920 B2 | * | 2/2008 | Schneider et al. | 285/256 |
| 7,350,826 B2 | * | 4/2008 | Cantrell et al. | 285/256 |
| 7,384,074 B2 | * | 6/2008 | He | 285/256 |
| 7,520,042 B2 | * | 4/2009 | Ingram | 285/256 |
| 7,562,910 B2 | * | 7/2009 | Kertesz et al. | 285/256 |
| 7,661,444 B2 | * | 2/2010 | Hilgert | 285/903 |
| 7,849,884 B2 | * | 12/2010 | Dickel | 285/256 |

* cited by examiner

CRIMP FITTING FOR CORRUGATED STAINLESS STEEL TUBING

CROSS-REFERENCE TO RELATED APPLICATION

This application claims the benefit of copending application U.S. Provisional Application Ser. No. 60/841,877 filed on Aug. 31, 2006, the disclosure of which is expressly incorporated herein by reference in its entirety.

FIELD OF INVENTION

The present invention relates to gas and liquid piping systems, and more particularly to a fitting incorporating a crimp sealing device and method for forming a seal between a length of corrugated tubing and the fitting.

BACKGROUND OF THE INVENTION

Gas and liquid piping systems which utilize corrugated stainless steel tubing ("CSST") and fittings are known. Such piping systems can be designed for use in combination with elevated gas pressures of up to about 0.03 megapascals (MPa) or more, and provide advantages over traditional rigid black iron piping systems in terms of ease and speed of installation, elimination of onsite measuring, and reduction in the need for certain fittings such as elbows, tees, and couplings.

An exemplary self-aligning and self-flaring fitting assembly, which does not require the use of a sealing gasket, is disclosed in U.S. Pat. No. 6,173,995 to Mau ("the '995 patent"), which is incorporated by reference herein. The '995 patent is owned by Titeflex Corporation, assignee of the present application, and discloses a self-flaring fitting assembly for use with semi-flexible, convoluted tubes or pipes, including CSST systems. The fitting assembly includes an externally-threaded adapter having a pipe receiving bore divided into a plurality of sections of different diameters, a nut threaded to a first end of the adapter, and a split bushing assembly with at least two internally spaced ribs for engaging circumferential grooves of the corrugated tubing, as shown in FIGS. 2-5 of the '995 patent. The fitting assembly disclosed in the '995 patent forms a seal by compressing an end corrugation or convolution between an internal stop shoulder of the adapter and one end of the split bushing assembly. A seal formed according to the above mechanism may be suitable for preventing leaking of gas and/or liquid through the pipe and fitting connection. However, in some instances, excessive torque may be required to create a seal on certain types of tubing.

It would be desirable to generate a uniform force, per circumferential unit distance, sealing interface that can provide a known sealing pressure per unit area of corrugated sealing surface engaged.

It would also be desirable to provide a fitting having a suitable sealing mechanism for connecting the fitting to a length of tubing. Such a fitting preferably could be adapted for use with different types of tubing and fitting interfaces and other piping and tubing systems, particularly those designed for transporting gas and/or liquid.

In some fittings designed for use with CSST systems, an end corrugation of the tubing is compressed to form a metal-to-metal seal. Examples of such sealing arrangements include U.S. Pat. No. 6,428,052 to Albino et al., U.S. Pat. No. 6,877,781 to Edler, and U.S. Pat. No. 6,908,114 to Moner.

It would be desirable to provide an improved fitting configured for connection to a length of corrugated tubing, where the fitting incorporates a sealing mechanism including at least a crimp sealing device. The fitting and related devices and methods should overcome the deficiencies of the presently available fittings and sealing arrangements, for which it can be difficult to produce a suitable amount of torque, and in which a suitable circumferential sealing force per unit area has not heretofore been achieved.

SUMMARY OF THE INVENTION

A fitting incorporating a crimp sealing device and a method for forming a seal between a length of corrugated tubing and the fitting are disclosed. The tubing can be corrugated stainless steel tubing (CSST) commonly used in gas and liquid piping systems. The tubing can be at least partially covered with a jacket. At least one crimp seal preferably is formed between the tubing and/or jacket, and the fitting. As used herein, the term "crimp sealing device" refers to one or more components made of metal or another material that are crimped and sealed together. According to the present invention, a suitable seal can be formed without requiring excessive torque to form the seal. Instead, a predetermined sealing pressure per unit area preferably is applied to a sealing interface. A crimp seal formed according to the present invention generally is more tolerant to different tubing cuts, whereas the prior art sealing technique of collapsing or crushing the corrugated tubing by use of a nut in conjunction with an adapter generally requires a clean cut in order to form a reliable seal.

A fitting according to the present invention can include at least an adapter or body member, and a sleeve member including at least an outer sleeve and optionally including an inner sleeve. The outer sleeve can be affixed to the adapter by using any of a number of known techniques, including but not limited to groove sealing, press fitting, and brazing. The sleeve member also can include an inner sleeve configured to be received within one or more corrugations of a length of tubing. The outer sleeve can be formed with one or more bends or bulges such that a plurality of sections having different diameters are provided. One or more of the bends or bulges can be useful in forming the crimp sealing device as described herein.

A plurality of types of crimp sealing devices can be used with the present invention. For example, the outer sleeve can include a jacket crimp, whereby an end of the outer sleeve is crimped and sealed to the jacket surrounding the tubing. Another type of crimp sealing device is a sealing crimp which can be formed by crimping the outer sleeve around the tubing. In a first preferred embodiment, the crimp sealing device is formed along an interface between the outer sleeve and the tubing, preferably around at least one peak of the tubing. In a second preferred embodiment, the crimp sealing device is formed with at least one preformed bend or bulge. The preformed shape ensures a controlled interface for sealing between the inside of the outer sleeve and the tubing outer diameter where the sealing takes place. Preferably the sealing crimp is applied radially outside the outer sleeve, thereby applying pressure against the tubing received within the outer sleeve.

In certain embodiments, the outer sleeve includes an enhanced thickness area that forms a sealing area, and the outer sleeve is shaped to accommodate at least one corrugation in the sealing area, such that the at least one corrugation can be collapsed axially as a result of radial pressure applied by the sealing crimp, thereby forming a primary seal. A sealing crimp applied radially also can result in radial compression of at least one corrugation of the tubing, either with or without the sealing area.

An inner sleeve can be provided in addition to the outer sleeve, the inner sleeve preferably being arranged radially inside of the outer sleeve, such that one or more corrugations of the tubing are received radially between the inner and outer sleeves.

One or more gaskets or O-rings further can be received in the outer sleeve, the gaskets configured to contact the tubing inserted between the inner and outer sleeves (if an inner sleeve is used), or to contact the tubing arranged inside the outer sleeve (if no inner sleeve is provided). Alternatively or additionally, one or more gaskets can be provided between the inner sleeve and the tubing. After a radial crimping operation is performed, the gaskets substantially engage the tubing, thus forming a secondary seal with the tubing.

Crimping and sealing according to the present invention can be carried out with the use of a specialized manual hand tool or automatic tool such as a power tool.

A sealing device for connecting a length of corrugated tubing to a fitting preferably includes the fitting having an outer sleeve configured to receive the length of tubing; and at least one sealing crimp formed in the outer sleeve and producing axial compression of at least one corrugation of the tubing.

A method for connecting a length of corrugated tubing to a fitting preferably includes the steps of: receiving the length of tubing in an outer sleeve of the fitting; and applying pressure to the outer sleeve to form a sealing crimp between the outer sleeve and the length of tubing.

Other aspects and embodiments of the invention are discussed below.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein.

DEFINITIONS

The instant invention is most clearly understood with reference to the following definitions:

As used in the specification and claims, the singular form "a", "an" and "the" include plural references unless the context clearly dictates otherwise.

As used herein, the terms "corrugated stainless steel tubing" and "CSST" refer to any type of semi-flexible tubing or piping, which may accommodate corrosive or aggressive gases or liquids, and includes but is not limited to semi-flexible tubing or piping made from: thermoplastics, metal or metal alloy materials such as olefin-based plastics (e.g., polyethylene (PE)), fluorocarbon polymers (e.g., polytetrafluoroethylene (PTFE)), carbon steel, copper, brass, aluminum, titanium, nickel, and alloys thereof.

DETAILED DESCRIPTION OF THE INVENTION

A fitting incorporating a crimp sealing device and a method for forming a seal between a length of corrugated tubing and the fitting are disclosed. The tubing can be corrugated stainless steel tubing (CSST) commonly used in gas and liquid piping systems. The tubing can be at least partially covered with a jacket. According to the present invention, at least one crimp seal is formed between the tubing and/or jacket, and the fitting. Therefore, a suitable seal can be formed between the tubing and/or jacket, and the fitting, without requiring excessive torque to form the seal. Optionally, one or more corrugations of the tubing may be collapsed or crushed axially and/or radially through application of radial force to form a crimp seal, but axial and/or radial collapsing or crushing of one or more corrugations is not required according to the present invention.

According to the present invention, various types of crimp sealing devices can be used. One type of crimp sealing device can be referred to as a jacket crimp, where a component of a fitting is crimped and sealed to a jacket covering a length of corrugated tubing, thereby forming a jacket lock. Another suitable type of crimp sealing device can be referred to as a sealing crimp, in which the sleeve member is crimped and sealed to one or more corrugations of the length of corrugated tubing, for example, on either side of a peak of the tubing or over a trough. This type of sealing crimp can be aided by the use of one or more preformed bends or bulges formed along at least one side of a corresponding corrugated peak. The sealing crimp according to the present invention can be formed by point crimping, for example, by crimping one or more points or incrementally segmented shapes along an interface between the fitting and the tubing. The sealing crimp can be formed as a continuous annular crimp around at least one corrugation, or as an intermittent crimp around the at least one corrugation. Alternatively or additionally, a sealing crimp can be formed by applying pressure radially, and preferably includes applying a radial and/or axial force to the at least one corrugation. Preferably, a predetermined sealing pressure per unit area is applied to one or more sealing interfaces.

A fitting according to the present invention includes at least an adapter or body member, and a sleeve member including an outer sleeve and optionally an inner sleeve. The sleeve member preferably is attached to the adapter during manufacturing, for example, by using any of a number of common techniques, in order to form a fluid tight seal between the sleeve member and the adapter. For example, the sleeve member can be affixed to the adapter by using a groove sealing technique, or the sleeve member can be press fit to the outer diameter of the adapter. A further suitable technique for connecting the sleeve member and the adapter is brazing. Additionally or alternatively, a compound such as a resin, adhesive, or epoxy can be applied to an interface between the sleeve member and the adapter to form a suitable bond. Optionally, the interface between the sleeve member and adapter can include an O-ring, gasket, or other elastomeric material. As an alternative to providing the sleeve member and adapter as separate components, a single integral sleeve member and adapter can be used.

Figures 1, 2:
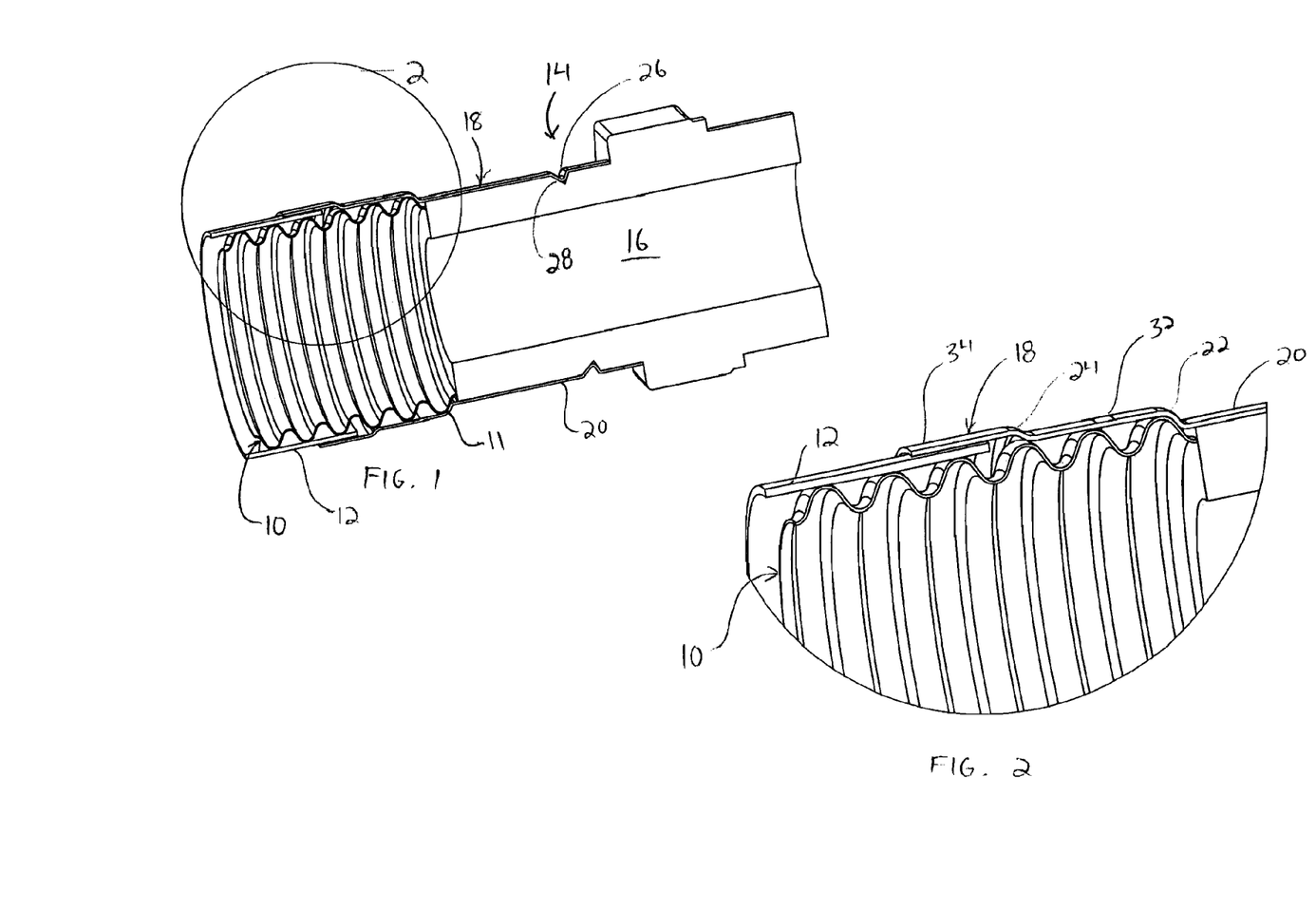
FIG. 1 is a cross-sectional view of a length of corrugated tubing received in a fitting, which incorporates a crimp sealing device according to the present invention.
FIG. 2 is an enlarged cross-sectional view of a specified portion of the tubing and fitting depicted in FIG. 1.

Referring to FIGS. 1 and 2, a length of corrugated tubing 10 preferably is at least partially covered by a jacket 12, where the tubing 10 and jacket 12 can be received in a fitting 14. The tubing 10 can be corrugated stainless steel tubing (CSST) commonly used for transporting gas and liquid, and the jacket 12 can be made of any suitable material, for example, polyethylene. Optionally, the tubing 10 can be provided without a jacket. In certain embodiments, the jacket 12 can be peeled back from an end of the tubing 10, thereby exposing one or more corrugations of the tubing 10.

The fitting 14 preferably includes at least an adapter or body member 16 and a sleeve member including at least an outer sleeve 18. The outer sleeve 18 can be attached to the adapter 16 by any of the above-described techniques, preferably prior to inserting the tubing 10 and jacket 12 into the fitting 14. The outer sleeve 18 preferably is made of metal or a metal alloy, but can be made of other formable materials such as plastics, polymers or elastomers. The outer sleeve 18 preferably includes a generally straight portion 20 configured to be attached to an outer diameter of the adapter 16. For example, the straight portion 20 of the outer sleeve 18 can be press fit, bonded, or brazed to the adapter 16. The outer sleeve 18 optionally may be formed with an indentation or notch 26 configured for attachment to a groove 28 of the adapter 16, where the indentation 26 and groove 28 optionally can be crimped together. The indentation or notch 26 can be formed in any desired shape, and may include one or more shapes in an intermittent end configuration. The indentation 26 and groove 28 can be formed at any suitable location along the outer sleeve 18 and adapter 16, respectively. Alternatively, the outer sleeve and adapter can be formed without a corresponding indentation and groove.

Preferably the outer sleeve 18 is preformed with one or more bends 22 and 24, for example, by crimping. A first bend 22 preferably serves as a transition between the straight portion 20 and a first section 32, and has an expanded outer diameter compared to the straight portion 20. A second bend 24 preferably serves as a transition between the first section 32 and a second section 34, and has a further expanded outer diameter. The depicted bends 22 and 24 encompass an arrangement including only one bend, two bends, or more bends as desired. Preferably the bends 22 and 24 are formed by an annular forming process, which is conventional and thus not further described herein. Use of an annular forming process or other forming technique can produce one or more bends, which results in various sections of different outer diameters in the outer sleeve 18, and a preformed interface approximately in the shape of the corrugated tubing.

In the embodiment depicted in FIGS. 1 and 2, the second section 34 has an outer diameter sufficiently large to accommodate the tubing 10 and jacket 12, where the second bend 24 can serve as a stop member for preventing further axial movement of the jacket 12. Also, while the first section 32 is not sufficiently large to accommodate the tubing 10 and jacket 12, the first section 32 is large enough to receive the tubing 10 alone. Therefore, a portion of the tubing 12 not covered by the jacket can be received in the first section 32. The first bend 22 preferably serves as a stop member for preventing further axial movement of the tubing 10, where the straight portion 20 has a smaller diameter than the first section 32, i.e., a diameter that is too small to accommodate the tubing 10. As shown in FIGS. 1 and 2, the tubing 10 includes a plurality of peaks 11 and corresponding valleys, where at least one of the peaks 11 can contact the first bend 22, thereby restraining the tubing from further axial movement in the direction of the adapter 16.

Referring to FIGS. 1 and 2, the outer sleeve 18 is preformed with the first and second bends 22 and 24, the bends preferably being formed prior to the tubing 10 being received in the fitting 14. The outer sleeve 18 is attached to the adapter 16, for example, by press fitting, bonding, or brazing, and the indentation 26 is received in the corresponding groove 28 of the adapter 16. In the views of FIGS. 1 and 2, the tubing 10 and jacket 12 have been received within the outer sleeve 18, such that corresponding peaks 11 abut the first and second bends 22 and 24, and the tubing 10 is restrained from further forward axial movement. After the tubing 10 has been fully inserted into the fitting 14, it is desirable to seal the tubing to the fitting by forming one or more crimps along an interface between the outer sleeve 18 and the tubing 10, and sealing the outer sleeve 18 against the tubing 10. A predetermined sealing pressure per unit area can be applied to the interface between the outer sleeve 18 and the tubing 10.

Figures 3, 4A, 4B:
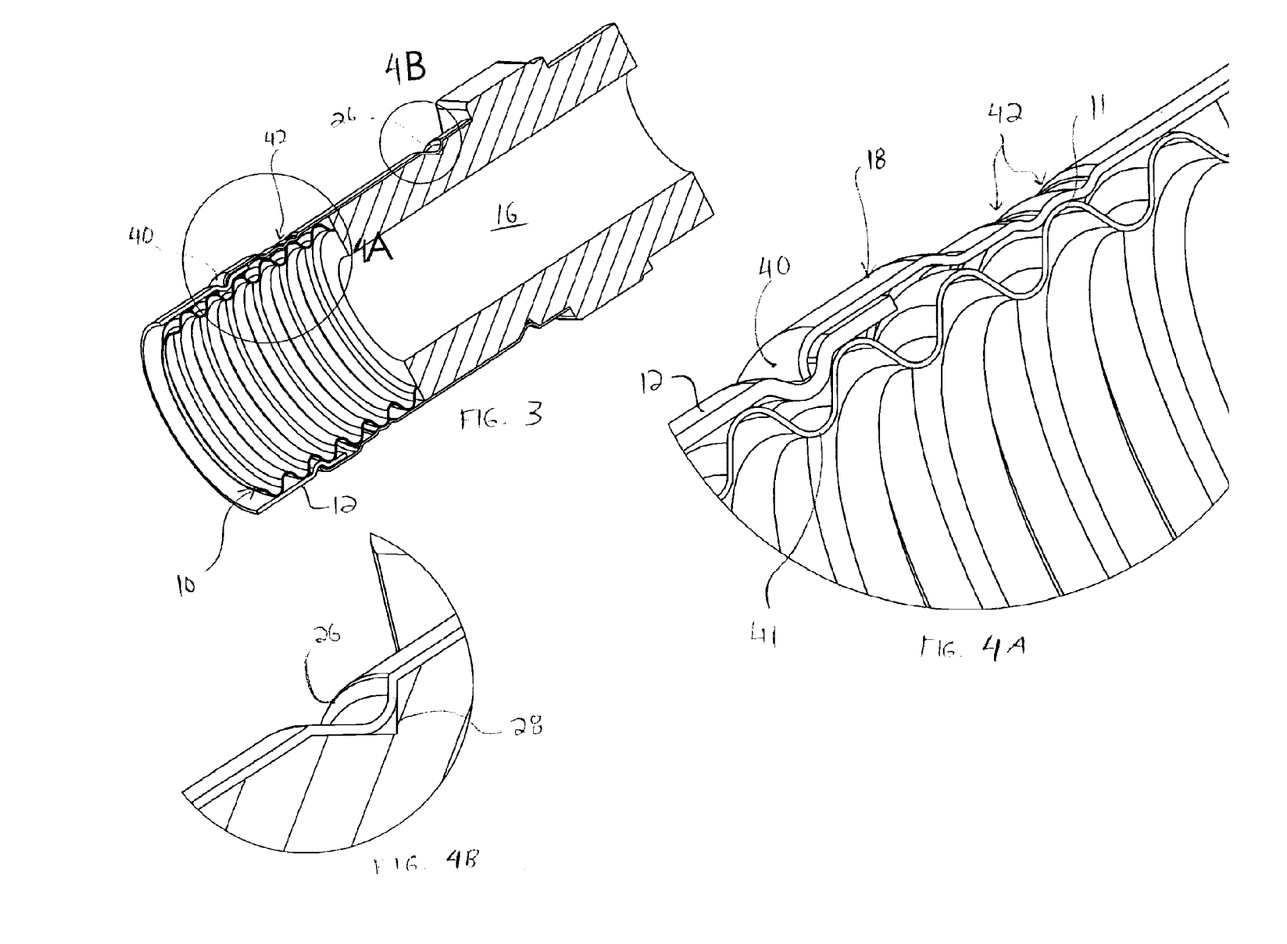
FIG. 3 is a cross-sectional view of the tubing and fitting of FIG. 1 after the tubing has been crimped according to a first preferred embodiment.
FIG. 4A is an enlarged cross-sectional view of a specified portion of the tubing and fitting depicted in FIG. 3.
FIG. 4B is an enlarged cross-sectional view of another specified portion of the tubing and fitting depicted in FIG. 3.

Referring to FIGS. 3 and 4A-4B, a first preferred embodiment of a crimp sealing device is shown, in which one or more crimps are formed along an interface between the outer sleeve 18 and the tubing 10. The one or more crimps include a jacket crimp 40 and a sealing crimp 42. The jacket crimp 40 can be formed on at least an end of the outer sleeve 18, where the end of the outer sleeve 18 preferably is crimped to the jacket 12 covering the tubing 10 received in the fitting 14. For example, the end of the outer sleeve 18 can be crimped to the jacket 12 within a corresponding valley 41 of the tubing 10, thereby sealing the outer sleeve 18 to the jacket 12 (see FIG. 4A). The jacket crimp 40 can be formed over an outer sleeve that is either continuous or notched, and preferably extends substantially around an outer diameter of the jacket and tubing, in order to fix the outer sleeve 18 to the jacket 12. The jacket crimp 40 provides a locking function, thereby preventing axial movement of the jacket 12 in a direction away from the adapter 16. The jacket crimp 40 can provide strain relief for the sealing area around the corrugation peak 11.

As shown in FIG. 4A, a sealing crimp 42 is formed over at least one peak 11 of the tubing 10. The sealing crimp 42 is a crimp that fixes the outer sleeve 18 to the tubing 10, and also is sealed in a fluid-tight manner, thereby preventing escape of any gas or liquid from the tubing/fitting interface. As a result of the sealing crimp 42, the outer sleeve 18 becomes deformed, thereby forming an arc that substantially contacts the underlying corrugation peak 11. According to the first preferred embodiment, the sealing crimp 42 preferably is formed on both sides of the corrugation peak 11. This area of contact at the tubing/fitting interface produces a tensile hoop stress in the outer sleeve 18, and a compressive hoop stress in the tubing 10, resulting in sealing and fixation of the outer sleeve 18 to the tubing 10. Alternatively, a sealing crimp can be formed over a trough of one or more corrugation segments.

According to the present invention, sealing generally takes place after a crimping operation is performed, for example, by using a specialized manual hand tool or power tool. Any of a number of conventional tools can be used to form a proper seal. By using a circular rotating motion of the tool, the outer sleeve 18 can be deformed, in order to create a crimped seal. The sealing crimp 42 formed according to the present invention can be continuous or intermittent, and can include one or more shapes such as pointed or wedged shapes and/or can be formed with lands or other profiles. In the case of intermittent crimp geometry, the crimped shape may be staggered and have various shapes or profiles.

Referring to FIG. 4B, an interface between the indentation 26 of the outer sleeve, and the groove 28 formed in the adapter 16 is shown in greater detail. For example, the indentation 26 may be preformed and pre-crimped to the indentation 28, thereby fixing the outer sleeve 18 to the adapter 16. Alternatively, the indentation 28 can be formed, for example, by crimping at the same time as forming the jacket crimp 40 and sealing crimp 42.

Figures 5, 6A, 6B:
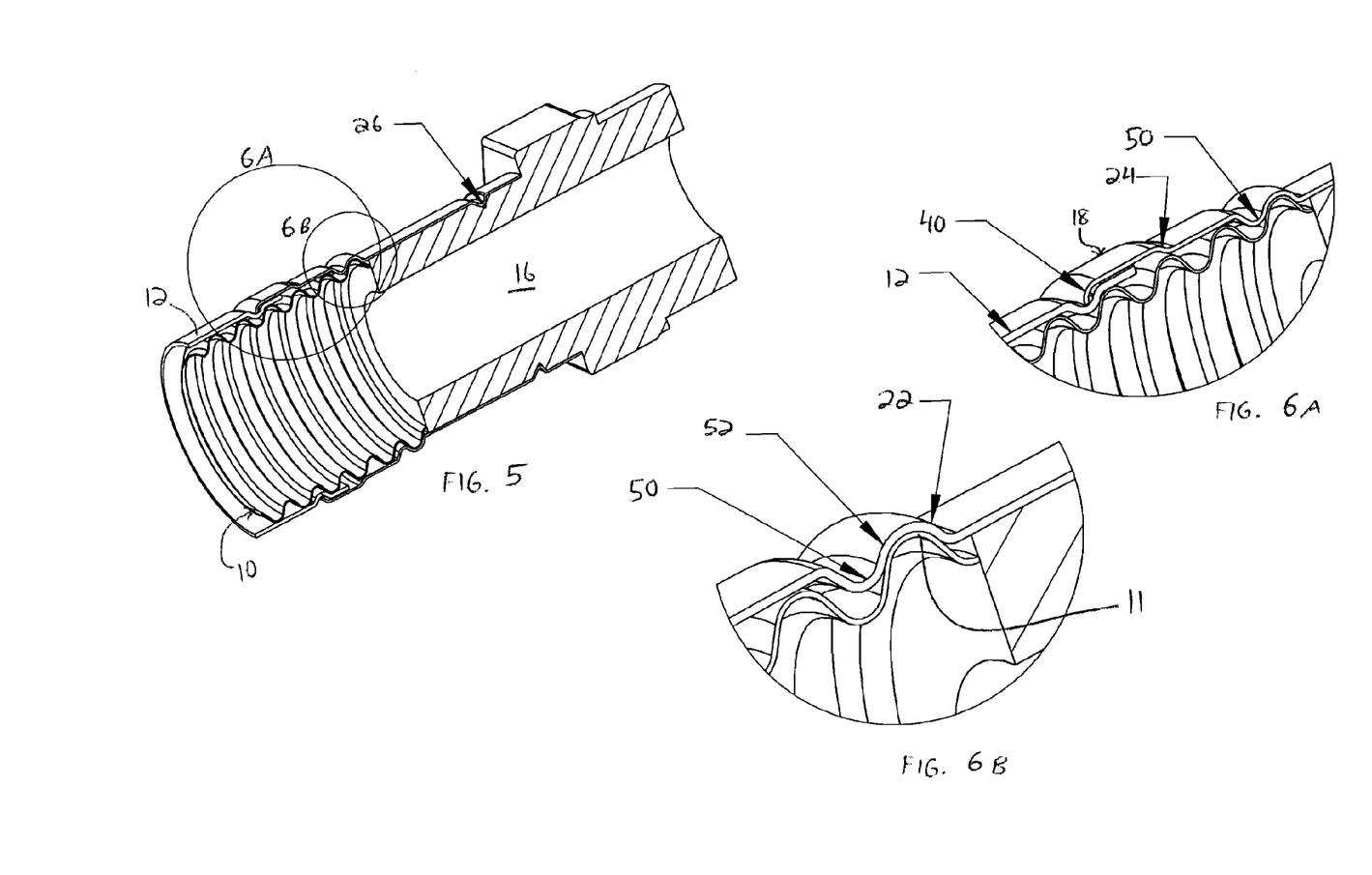
FIG. 5 is a cross-sectional view of the tubing and fitting of FIG. 1 after the tubing has been crimped according to a second preferred embodiment.
FIG. 6A is an enlarged cross-sectional view of a specified portion of the tubing and fitting depicted in FIG. 5.
FIG. 6B is a further enlarged cross-sectional view of another specified portion of the tubing and fitting depicted in FIG. 5.

A second preferred embodiment of a crimp sealing device is shown in FIGS. 5 and 6A-6B depicting one or more crimps formed along an interface between the outer sleeve 18 and the tubing 10. The one or more crimps include a jacket crimp 40 and a sealing crimp 50. The jacket crimp 40 is substantially similar to the jacket crimp depicted in the first preferred embodiment of FIGS. 3 and 4A-4B.

Referring to FIGS. 6A and 6B, the first and second bends 22 and 24 are depicted, where these bends preferably are preformed in the outer sleeve 18, for example, prior to inserting the tubing 10 into the fitting 14. According to the second preferred embodiment, the bend 22 is formed on one side of a corrugation peak 11 of the tubing 10, and the sealing crimp 50 is formed on the other side of the underlying corrugation peak 11 by deforming the outer sleeve 18 as shown at location 52. The sealing crimp 50 fixes the outer sleeve 18 to the tubing 10, and preferably forms a fluid-tight seal, thereby preventing escape of any gas or liquid from the tubing/fitting interface. As a result of the sealing crimp 50, the outer sleeve 18 becomes deformed, thereby forming an arc that substantially contacts the underlying corrugation peak 11, in a manner similar to the sealing crimp 42 depicted in FIG. 4A. However, according to the second preferred embodiment, the sealing crimp 50 is formed on only one side of the corrugation peak 11, as the preformed bend 22 is already present on the other side of the corrugation peak 11. By contrast, in the first preferred embodiment, the sealing crimp 42 is formed on both sides of the corrugation peak 11. Alternatively, a sealing crimp can be formed over a trough formed by one or more corrugation segments.

Figure 7:
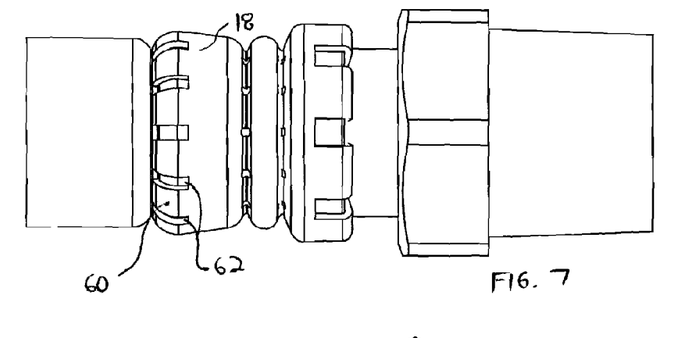
FIGS. 7 and 8 are perspective views of a length of corrugated tubing received in a fitting, which incorporates a sealing device having a point crimp according to the present invention.
Figure 8:
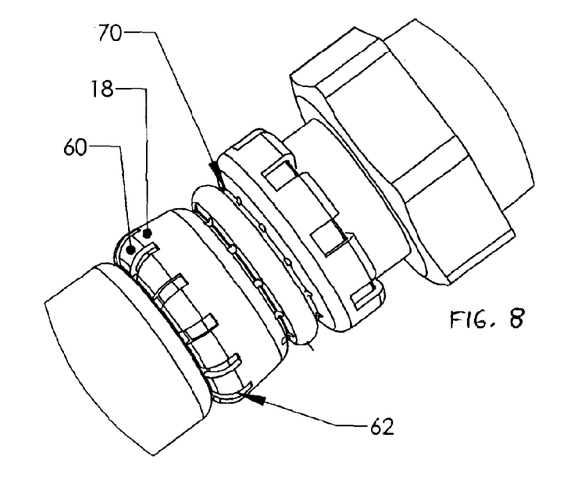

FIGS. 7 and 8 depict an alternative of the jacket crimp depicted in the first and second preferred embodiments. In FIGS. 7 and 8, instead of being substantially continuous, ends of the outer sleeve 18 are notched. In particular, the outer sleeve 18 includes a jacket crimp 60 in which ends of the outer sleeve 18 include a plurality of notches 62 or gaps in which portions of the outer sleeve are removed. A suitable crimp and seal can be formed by using the jacket crimp 60 in contact with the corrugated tubing.

As shown in FIGS. 7 and 8, a sealing crimp 70 constitutes as a point crimp. In FIGS. 7 and 8, the sealing crimp 70 can be formed according to the first and/or second embodiments. However, instead of forming the sealing crimp substantially continuously along an interface between the tubing and the outer sleeve 18, the sealing crimp 70 is formed at various points distributed along this interface. A suitable crimp and seal can be formed according to this sealing device and method.

Figure 9:
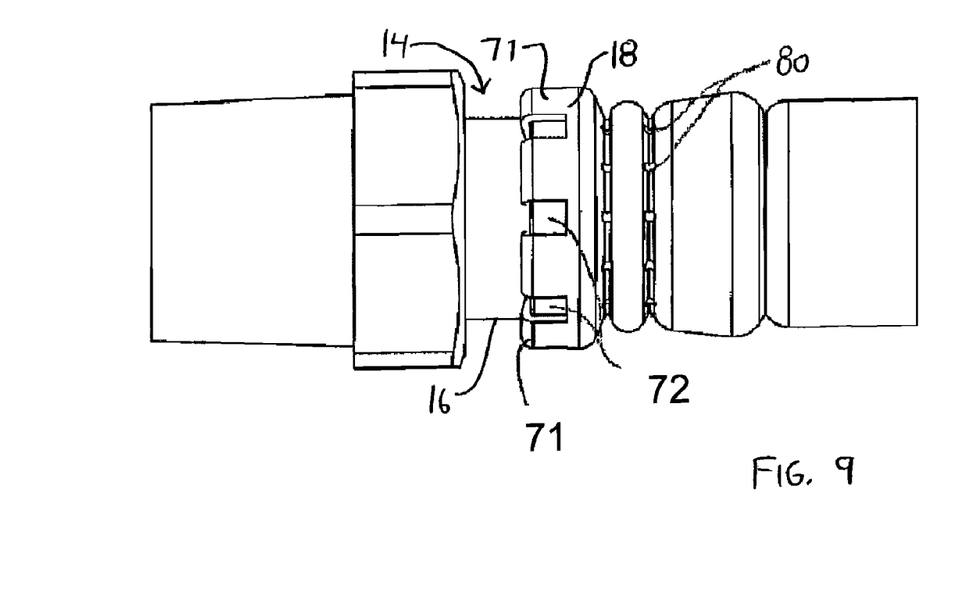
FIG. 9 is a perspective view of a length of corrugated tubing received in a fitting, which incorporates a plurality of fingers crimped to the adapter.

FIG. 9 depicts an alternative in which the outer sleeve 18 is affixed to the fitting 14 by a plurality of fingers 71, which are preferably crimped and deformed over the adapter 16. In other words, the fingers 71, which are crimped to the adapter 16 on the fitting end of the outer sleeve, can replace the notch/groove crimping arrangement depicted in previous embodiments. The fingers 71 can be separated by a plurality of notches 72 to allow for suitable deformation of the outer sleeve 18. A sealing crimp 80 can be formed as in previous embodiments.

Additional preferred embodiments of a crimp sealing device are now described, and preferably incorporate a jacket crimp or jacket lock and a sealing crimp, as described above. For example, the sealing crimp is carried out by use of a manual or automatic tool, which can exert pressure radially against the outer sleeve. However, the additional preferred embodiments differ from the first and second embodiments in that the outer sleeve is formed with an enhanced thickness sealing area configured to receive one or more corrugations of the tubing, and causing the one or more corrugations, for example, an end corrugation, to collapse or deform axially against the sealing area.

Figure 10A:
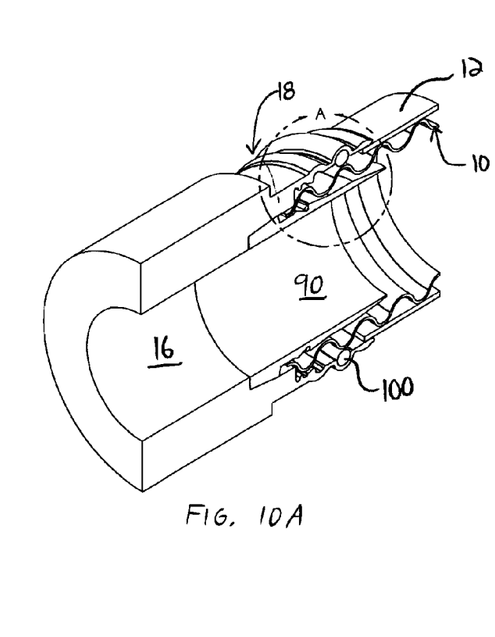
FIG. 10A is a cross-sectional view of a third preferred embodiment of a crimp sealing device in which a length of corrugated tubing is received in a fitting, the fitting including an adapter, inner and outer sleeves, and a gasket.
Figure 10B:
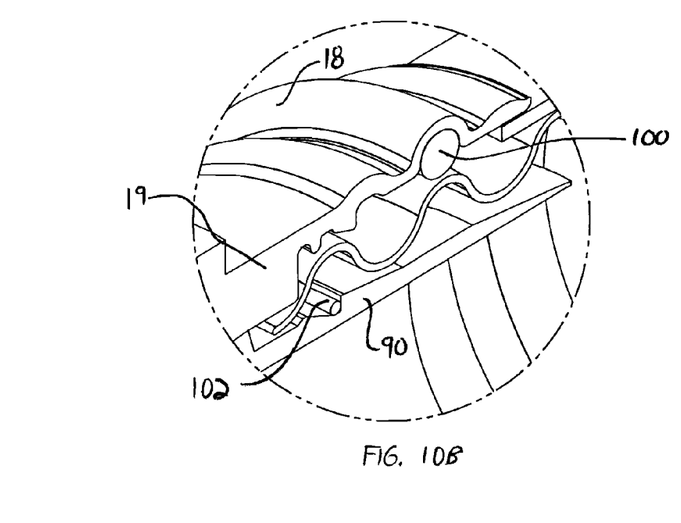
FIG. 10B is an enlarged cross-sectional view of a specified portion of the tubing and fitting depicted in FIG. 10A.

Referring to FIGS. 10A-10B and 11A-11C, a third preferred embodiment of a crimp sealing device is provided, in which the length of corrugated tubing 10, which can be at least partially covered by the jacket 12, is received in a fitting including the adapter 16, the outer sleeve 18, and an inner sleeve 90. Referring to FIGS. 10A-10B, the tubing 10 is configured to be received in a space between the outer sleeve 18 and the inner sleeve 90. The inner sleeve 90 preferably is formed with various geometries and different thicknesses to accommodate the length of tubing 10. Similarly, the outer sleeve 18, while generally similar to the outer sleeve described with respect to the first and second embodiments, may further include various geometries and thicknesses, and features for engaging one or more tubing corrugations.

Figure 11A:
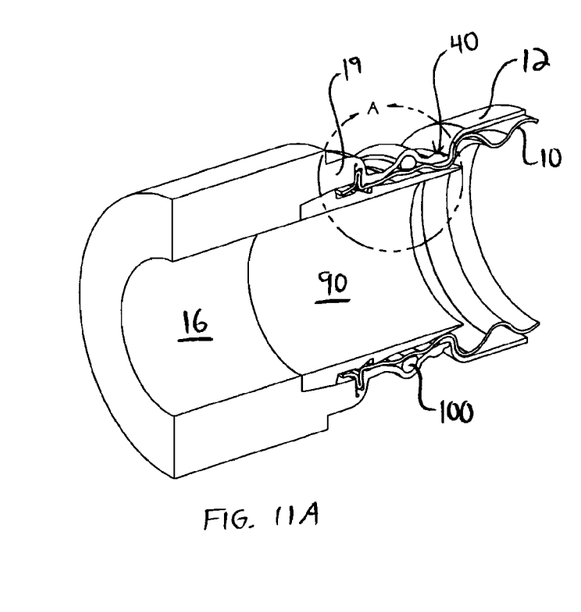
FIG. 11A is a cross-sectional view of the tubing and fitting of FIG. 10A after the tubing has been crimped according to the third preferred embodiment.
Figure 11B:
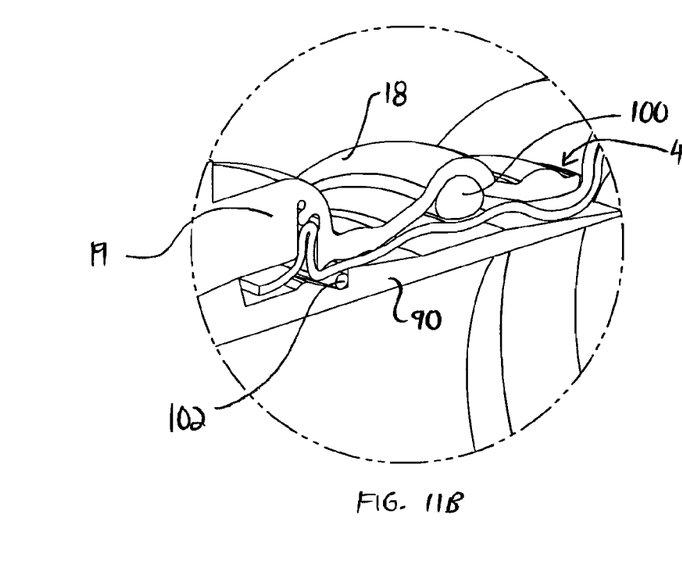
FIG. 11B is an enlarged cross-sectional view of a specified portion of the tubing and fitting depicted in FIG. 11A.
Figure 11C:
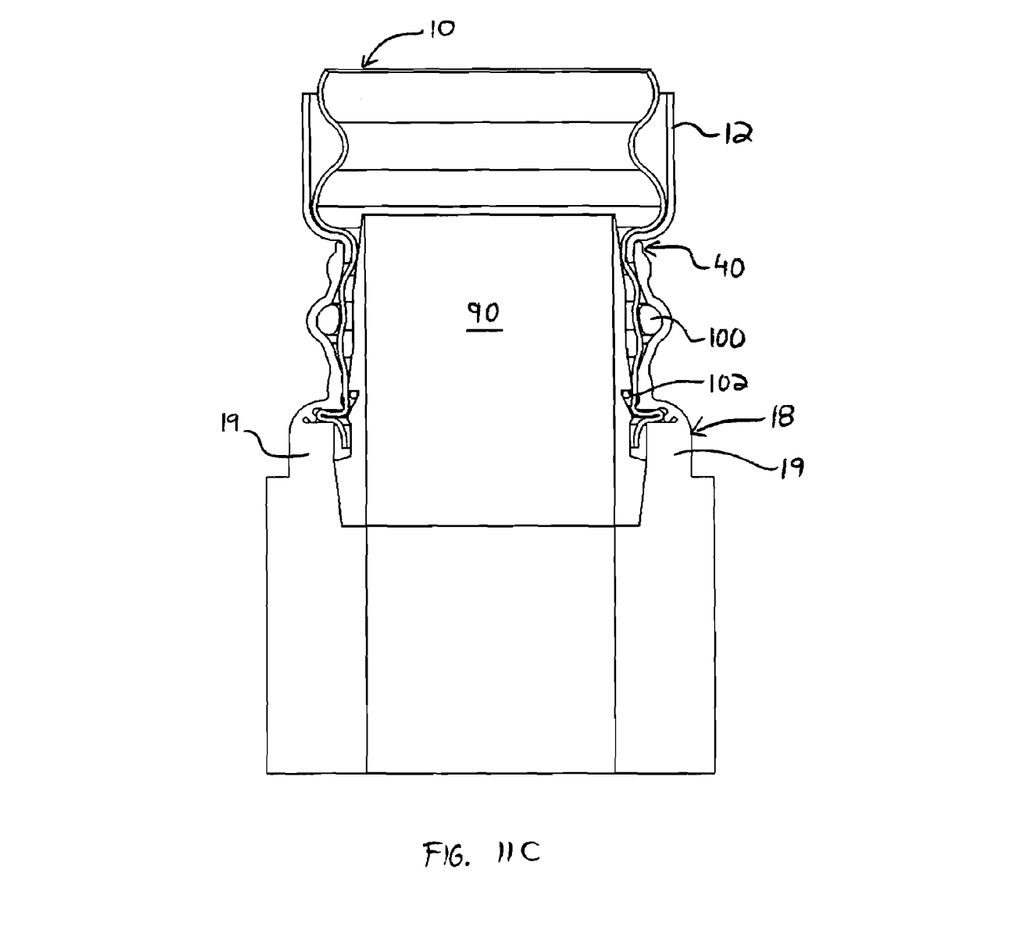
FIG. 11C is an enlarged and rotated cross-sectional view of the tubing and fitting depicted in FIG. 11A.
Figure 12A:
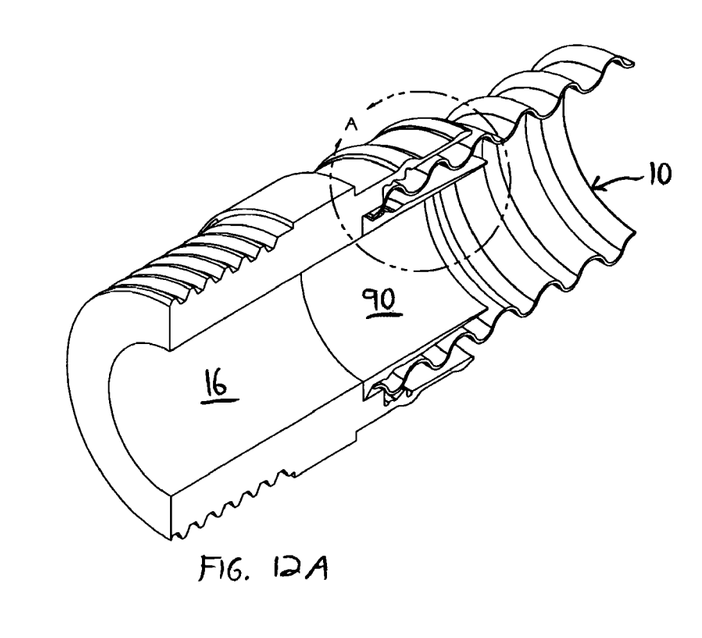
FIG. 12A is a cross-sectional view of a fourth preferred embodiment in which a length of corrugated tubing is received in a fitting, the fitting including an adapter, an inner sleeve, and an outer sleeve.
Figure 12B:
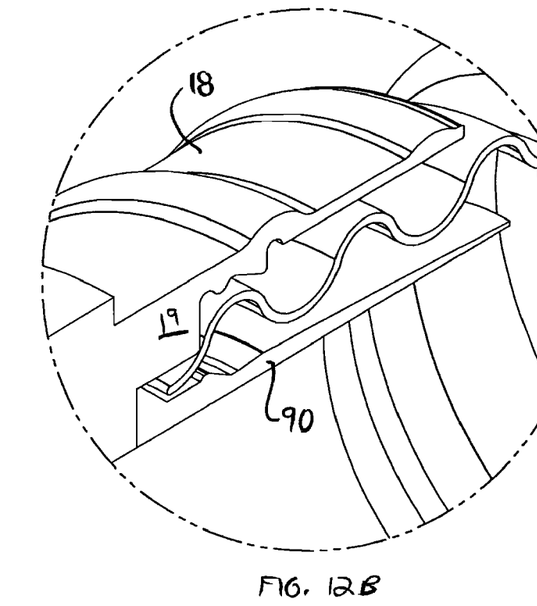
FIG. 12B is an enlarged cross-sectional view of a specified portion of the tubing and fitting depicted in FIG. 12A.

According to the third preferred embodiment, the outer sleeve 18 further includes a sealing area 19 in the form of an enhanced thickness section of the outer sleeve 18 configured to receive at least one corrugation of the tubing. As shown in FIGS. 11A-11C, the outer sleeve 18 can be compressed radially in a crimping operation. The shape and structure of the outer sleeve 18 in the sealing area 19 facilitates collapsing or crushing of one or more corrugations of the tubing 10, such that the one or more corrugations engage the sealing area 19. Therefore, a sealing crimp is applied radially, which results in axial compression of at least one corrugation against the sealing area 19 of the outer sleeve 18, thus forming a primary seal. Crimping can be performed by any suitable manual or automatic tool preferably by applying pressure radially against the outer sleeve, where the geometry of the outer sleeve 18 results in axial and/or radial compression of the at least one corrugation.

Referring again to FIGS. 10A-10B, the fitting is further provided with one or more gaskets or O-rings 100 and 102, the gasket 100 being arranged on or adjacent to the outer sleeve 19 facing the tubing 10, and the gasket 102 being arranged on or adjacent to the inner sleeve 90 facing the tubing 10, where the tubing 10 preferably is inserted between the inner and outer sleeves. Additional gaskets can be arranged on or adjacent to the inner and outer sleeves, and are preferably configured to contact the tubing. After crimping is performed, as shown in FIGS. 11A-11C, the gaskets 100 and 102 substantially engage the tubing 10, and thus form a secondary seal with the tubing.

In the third preferred embodiment, as shown in FIGS. 11A-11C, a jacket crimp is provided in a manner similar to the jacket crimp previously described with reference to the first and second preferred embodiments. The jacket crimp 40 can be formed on at least an end of the outer sleeve 18, where the end of the outer sleeve 18 preferably is crimped to the jacket 12 over the tubing 10.

Fourth and fifth preferred embodiments of a sealing device are depicted in FIGS. 12A-12B and 13A-13B, respectively. The fourth preferred embodiment shown in FIGS. 12A-12B differs from the third preferred embodiment by eliminating the gaskets, thus performing a crimping operation without forming a secondary seal. According to the fourth preferred embodiment, a primary seal is formed when a sealing crimp is applied radially to the outer sleeve 18, so that one or more corrugations of the tubing are collapsed axially against the sealing area 19. Alternatively or additionally, a primary seal may be formed when a sealing crimp is applied radially to the outer sleeve 18, so that one or more corrugations of the tubing are compressed radially against the inner sleeve 90. However, the secondary seal is omitted, for example, in instances where such a seal is considered unnecessary.

Figure 13A:
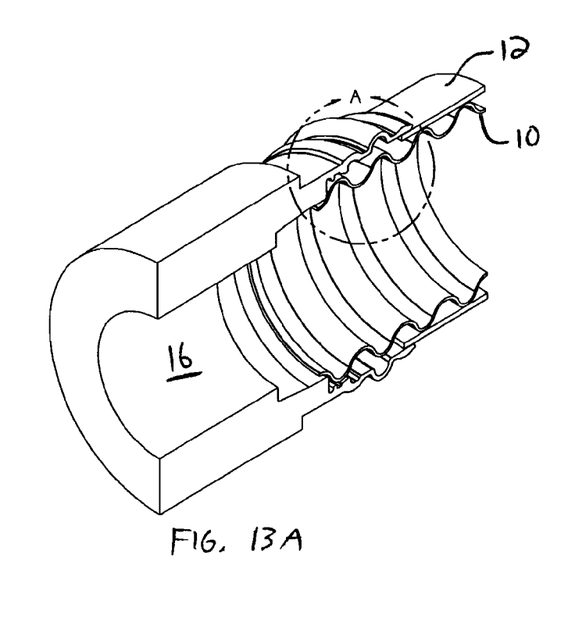
FIG. 13A is a cross-sectional view of a fifth preferred embodiment in which a length of corrugated tubing is received in a fitting, the fitting including an adapter and an outer sleeve.
Figure 13B:
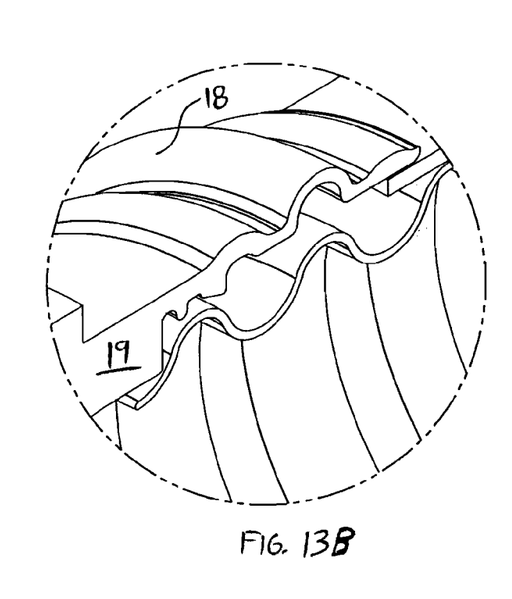
FIG. 13B is an enlarged cross-sectional view of a specified portion of the tubing and fitting depicted in FIG. 13A.

The fifth preferred embodiment is depicted in FIGS. 13A-13B, where the fifth preferred embodiment differs from the third preferred embodiment by eliminating the inner sleeve and the gaskets. Thus, the fifth preferred embodiment is similar to the first and second preferred embodiments, but the outer sleeve 18 in FIGS. 13A-13B has been modified to include the sealing area 19 similar to the third and fourth preferred embodiments. A satisfactory seal can be formed by performing a crimping operation radially against the outer sleeve, such that the outer sleeve contacts the tubing 10 and compresses at least one corrugation axially and/or radially against the sealing area 19, thus forming a primary seal.

A sixth preferred embodiment of a sealing device can include at least an outer sleeve and one or more gaskets, but without an inner sleeve. Although not shown, this embodiment is similar to the third preferred embodiment depicted in FIGS. 10A-10B and 11A-11C, but without use of the inner sleeve 90.

The above-described crimp sealing devices and methods can yield significant benefits. According to the present invention, a length of tubing can be inserted directly into the fitting, and no disassembly of the fitting is required. An automatic or manual tool can be used to effect crimp sealing according to the above-described embodiments of the invention, where the tool can control relative movement of the tubing and fitting each time a crimping operation is carried out, thus preventing over-crimping or under-crimping. Preferably crimping occurs around one or more peaks or crowns of the corrugated tubing, such that crimping occurs away from a cut end of the tubing, which could denigrate the seal. Therefore, the crimp sealing device and method provide for ease of assembly and avoid the necessity of delivering large amounts of torque to form an adequate seal.

A method for connecting a length of corrugated tubing to a fitting preferably includes the steps of: receiving the length of tubing in an outer sleeve of the fitting; and applying pressure to the outer sleeve to form a sealing crimp between the outer sleeve and the length of tubing.

A further method for connecting a length of corrugated tubing to a fitting preferably includes the steps of: receiving the length of tubing in an outer sleeve of the fitting; and applying pressure to the outer sleeve to form a sealing crimp between the outer sleeve and the length of tubing, the outer sleeve including a sealing area for receiving at least one corrugation of the tubing, such that the at least one corrugation is compressed axially against the sealing area when the pressure is applied to the outer sleeve.

According to the above methods, the length of tubing can be covered by a jacket, and a crimp can be formed between an end of the outer sleeve and the jacket.

According to the above methods, an inner sleeve can be arranged radially inside the outer sleeve. Alternatively or additionally, at least one gasket can be provided in the outer sleeve and/or the inner sleeve, the at least one gasket configured to form a secondary seal with the tubing.

The present invention also encompasses methods for transporting gas and liquid through piping or tubing, in which at least a length of tubing is sealed to a fitting as provided above. The methods can include transporting the gas and liquid to a device, such as a boiler, furnace, or stove.

The present invention further encompasses a method for installing a piping or tubing system in a structure, such as a commercial or residential building, where the installation method includes installing at least a length of tubing that is sealed to a fitting in the manner provided above. For example, the piping or tubing system can utilize CSST tubing and fittings.

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications and other references cited herein are hereby expressly incorporated herein in their entireties by reference.

What is claimed is:

1. A sealing device for connecting a length of corrugated tubing, comprising:
    an outer sleeve having a substantially uniform thickness and configured to receive the length of tubing; and
    at least one sealing crimp formed in the outer sleeve at an interface between the outer sleeve and over a peak of at least one corrugation of the tubing such that the outer sleeve forms an arc that substantially contacts the at least one corrugation on both sides of the peak.

2. The sealing device of claim 1, wherein the length of tubing is at least partially covered by a jacket.

3. The sealing device of claim 2, further comprising a jacket crimp formed between an end of the outer sleeve and the jacket.

4. The sealing device of claim 3, wherein the end of the outer sleeve is notched or formed into at least one shape.

5. The sealing device of claim 1, wherein the outer sleeve is preformed with at least one bend or bulge.

6. The sealing device of claim 5, wherein the at least one bend or bulge is formed by an annular forming technique.

7. The sealing device of claim 5, wherein the at least one bend or bulge constitutes a stop member for restraining axial movement of the tubing.

8. The sealing device of claim 1, wherein the fitting further includes an adapter, and the adapter is configured to receive the outer sleeve.

9. The sealing device of claim 8, wherein an end of the outer sleeve is crimped to the adapter by a plurality of fingers.

10. The sealing device of claim 1, wherein the at least one crimp is formed as a point crimp over the interface between the outer sleeve and the at least one corrugation.

11. The sealing device of claim 1, wherein the outer sleeve includes a sealing area configured to receive the at least one corrugation, and the at least one corrugation is compressed axially against the sealing area to form a primary seal.

12. The sealing device of claim 11, wherein the at least one corrugation is compressed radially by the at least one crimp.

13. The sealing device of claim 1, further comprising an inner sleeve arranged radially inside the outer sleeve.

14. The sealing device of claim 13, further comprising at least one gasket provided in at least one of the inner sleeve and the outer sleeve, the at least one gasket configured to form a secondary seal with the tubing.

15. The sealing device of claim 1, wherein the at least one corrugation remains substantially undeformed after application of the at least one crimp.

16. A sealing device for connecting a length of corrugated tubing to a fitting, comprising:
the fitting having an outer sleeve configured to receive the length of tubing; and
at least one sealing crimp formed in the outer sleeve, the sealing crimp producing axial compression of a first corrugation of the tubing as a result of radial compression and deformation of a second corrugation of the tubing.

17. The sealing device of claim 16, wherein the outer sleeve includes a sealing area configured to receive the first corrugation, and the first corrugation is compressed axially against the sealing area to form a primary seal.

18. The sealing device of claim 16, further comprising an inner sleeve arranged radially inside the outer sleeve.

19. The sealing device of claim 18, further comprising at least one gasket provided in at least one of the inner sleeve and the outer sleeve, the at least one gasket configured to form a secondary seal with the tubing.

20. The sealing device of claim 16, further comprising at least one gasket provided in the outer sleeve, the at least one gasket configured to form a seal with the tubing.

21. A method for connecting a length of corrugated tubing, comprising the steps of:
receiving the length of tubing in an outer sleeve having a substantially uniform thickness; and
applying pressure to the outer sleeve to form at least one sealing crimp between the outer sleeve and the length of tubing over a peak of at least one corrugation of the tubing such that the outer sleeve forms an arc that substantially contacts the at least one corrugation on both sides of the peak.

22. The method of claim 21, wherein the length of tubing is covered by a jacket.

23. The method of claim 22, further comprising the step of forming a crimp between an end of the outer sleeve and the jacket.

24. The method of claim 21, further comprising forming a point crimp over the interface between the outer sleeve and the at least one corrugation.

25. The method of claim 21, further comprising forming a continuous annular crimp around the at least one corrugation.

26. The method of claim 21, further comprising forming at least an intermittent crimp around the at least one corrugation.

27. The method of claim 21, wherein the outer sleeve includes a sealing area configured to receive at least one corrugation of the tubing.

28. The method of claim 21, wherein the at least one corrugation is compressed axially against the sealing area during the step of applying pressure to the outer sleeve.

29. The method of claim 21, wherein the at least one corrugation is compressed axially during the step of applying pressure to the outer sleeve.

30. The method of claim 21, further comprising an inner sleeve arranged radially inside the outer sleeve.

31. The method of claim 30, further comprising at least one gasket provided in the outer sleeve, the at least one gasket configured to form a secondary seal with the tubing.

32. The method of claim 21, further comprising at least one gasket provided in the outer sleeve, the at least one gasket configured to form a secondary seal with the tubing.

33. A method for connecting a length of corrugated tubing to a fitting, comprising the steps of:
receiving the length of tubing in an outer sleeve of the fitting; and
applying radial compression to the outer sleeve to form a sealing crimp between the outer sleeve and the length of tubing, the outer sleeve including a sealing area for receiving at least one corrugation of the tubing, such that a first corrugation is compressed axially against the sealing area when the radial compression to the outer sleeve radially compresses and deforms a second corrugation.

34. The method of claim 33, wherein the length of tubing is covered by a jacket.

35. The method of claim 34, further comprising the step of forming a crimp between an end of the outer sleeve and the jacket.

36. The method of claim 33, further comprising an inner sleeve arranged radially inside the outer sleeve.

37. The method of claim 33, further comprising at least one gasket provided in the outer sleeve, the at least one gasket configured to form a seal with the tubing.

* * * * *